United States Patent [19]
Schwartz

[11] 3,735,940
[45] May 29, 1973

[54] IDLER ASSEMBLY FOR TAPE CASSETTE

[75] Inventor: Vern R. Schwartz, Cupertino, Calif.
[73] Assignee: Information Terminals Corp., Mountain View, Calif.

[22] Filed: Feb. 5, 1971
[21] Appl. No.: 112,984

[52] U.S. Cl. ....................................242/199, 242/76
[51] Int. Cl. .........................G11b 23/10, B65h 27/00
[58] Field of Search......................242/199, 200, 197, 242/198, 71.1, 71.2, 76, 55.19 A; 226/192, 196, 198, 190, 197, 194

[56] References Cited

UNITED STATES PATENTS 2,911,215 11/1959 Cousino........................242/55.19 A
3,393,489 7/1968 Hass ................................226/196 X
3,189,289 6/1965 Maxey.............................226/192 X

*Primary Examiner*—George F. Mautz
*Attorney*—Townsend & Townsend

[57] ABSTRACT

An improved idler assembly for use as a tape guide in a tape cassette, especially a Phillips type tape cassette, wherein the assembly includes an idler rotatably mounted between the spaced, opposed walls of the cassette and having an outer, tape-engaging surface which is convex to present a crown to keep the tape centered on the idler as the tape moves partially about the idler and as the idler rotates in the cassette. The idler has a bore extending into one end face thereof and a coil spring in the bore biases the idler toward one wall of the cassette. The idler has a pair of end flanges with each flange having a barrier surface preventing any substantial axial movement of the tape relative to the crown.

8 Claims, 5 Drawing Figures

Patented May 29, 1973 3,735,940

INVENTOR.
VERN R. SCHWARTZ
BY Townsend and Townsend
ATTORNEYS

IDLER ASSEMBLY FOR TAPE CASSETTE

This invention relates to improvements in tape cassettes and, more particularly, to an improved idler assembly for use as a tape guide in a Phillips type tape cassette.

In a Phillips cassette, a pair of spaced idlers are positioned adjacent to one margin of the cassette to guide a stretch of magnetic tape along such margin, the tape being carried in the cassette by being wound on a pair of spaced, generally coplanar hubs rotatably mounted in the cassette. The wall of the cassette defining the aforesaid margin has openings by means of which a read-write head and a tape drive capstan can engage the adjacent tape stretch.

The problem arising with a conventional idler with a cassette of this type is that the tape moving past the idler has a tendency to shift axially on the idler and to ride off the same. The reason for this is that the conventional idler has a cylindrical outer, tape-engaging surface and a pair of opposed flanges which angle outwardly from the cylindrical surface at a given angle, such as 45°; thus, each flange presents a ramp along which the tape can readily move once the tape starts to move axially in one direction. Because of the ramp configuration of the flange, there is no barrier to inhibit such axial movement of the tape; thus, the tape, when it does ride up and off the idler, is stretched because the flange of the idler over which the tape edge margin moves has a longer radius than that of the cylindrical surface of the idler. This causes the tape edge margin to stretch, such stretch oftentimes resulting in a permanent set in the tape. Also, the stretch prevents the tape from being uniformly wound in the tape pack on a given hub and the tape pack assumes a bowl shape due to the distortion caused by the stretch. Moreover, as the stretched tape winds onto the tape pack, it improperly engages the adjacent slip sheet in the cassette and some of the metal oxide on the tape rubs off the same onto the slip sheet.

The present invention provides an improved idler assembly which overcomes the problem of axial movement of the tape with respect to an idler. To this end, the invention includes an idler having an outer, tape-engaging surface provided with a crown which operates to keep the tape substantially centered on the idler during movement of the tape past the idler. The idler is biased by a spring in one direction so that the idler is generally in the same position in the cassette at all times relative to the tape moving past the idler. Thus, the crown and biasing features of the idler assembly of this invention cooperate to keep the tape centered on the idler so that the tape can be uniformly wound on the tape pack of the take-up hub.

The idler also has a pair of opposed flanges which are axially spaced apart and which have flat, annular surfaces near the annular sides of the crown to present barriers to the tape in the event that there is any slight tendency for the tape to move axially on the idler. Such barrier surfaces are substantially perpendicular to the axis of rotation of the idler and at locations to engage the adjacent edge of the tape if axial movement occurs. Thus, the tape is prevented, even if it does tend to move axially, from moving up the flange as occurs with conventional idlers and not only is the tape not stretched, but also there is no damage to the edge of the tape itself.

The primary object of this invention is, therefore, to provide an improved idler assembly suitable for use in a Phillips type tape cassette wherein the idler of the assembly has an outer surface configured to keep the tape passing over it substantially centered and the idler is biased in a certain direction to keep it in a substantially fixed location to the tape moving past the same to minimize or eliminate any tendency for the tape to move axially and off the idler.

Another object of this invention is to provide an idler of the aforesaid character wherein the idler has a pair of opposed flanges between which the tape is to pass with each flange having a barrier surface across the path of axial movement of the tape relative to the idler so that the edge of the tape will engage such a barrier surface and prevent substantial axial movement of the tape.

A further object of this invention is to provide an improved tape cassette having the aforesaid idler assembly at each of a pair of spaced locations along one margin of the cassette to assure that the tape will be guided but will not be stretched as it moves in either direction along such margin to thereby permit the tape to be uniformly wound onto either of the pair of tape packs in the cassette.

Other objects of this invention will become apparent as the following specification progresses, reference being had to the accompanying drawing for an illustration of an embodiment of the assembly.

Figures 1, 2, 3, 4, 5:
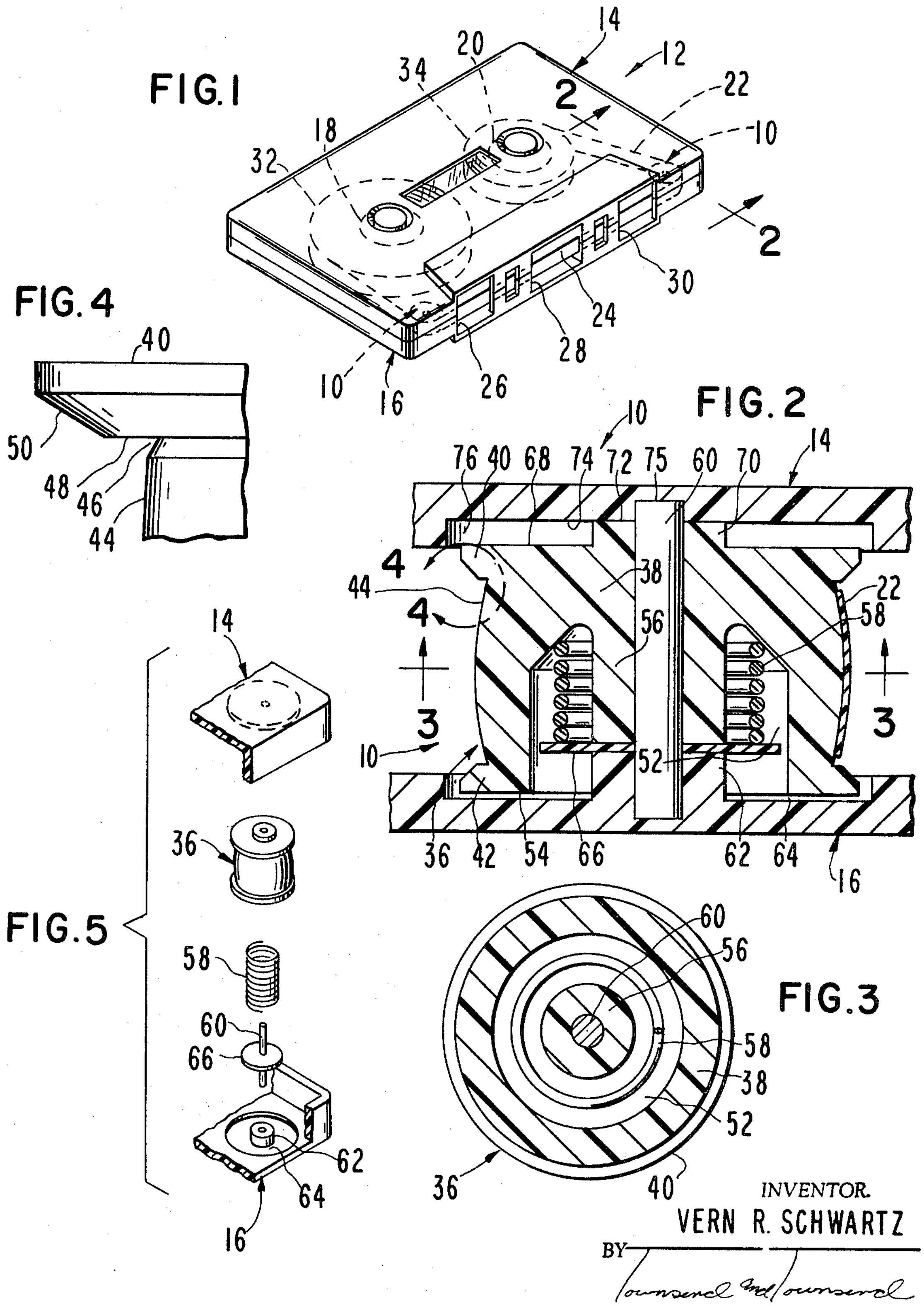
FIG. 1 is a perspective view of a tape cassette with which the improved idler assembly is to be used.
FIG. 2 is an enlarged, fragmentary, cross-sectional view taken along line 2—2 of FIG. 1.
FIG. 3 is a cross-sectional view taken along line 3—3 of FIG. 2.
FIG. 4 is an enlarged, fragmentary, view of the idler when viewing the area of FIG. 2 denoted by the circular line 4—4.
FIG. 5 is a fragmentary, exploded view of the view of the cassette in the vicinity of one of the idler assemblies thereof.

The idler assembly of this invention is broadly denoted by the numeral 10 and is especially adapted for use with a Phillips type tape cassette 12 (FIG. 1). Cassette 12 has a pair of shells or walls 14 and 16 which mate with each other in a known manner to provide an interior space for receiving and rotatably mounting a pair of tape hubs 18 and 20 on which a flexible magnetic tape 22 can be wound. The tape has a central stretch 24 which extends along one side margin of the cassette, the walls being apertured to present several spaced openings 26, 28 and 30 by means of which portions of stretch 24 are exposed. Opening 28, for instance, permits the adjacent tape stretch portion to be engaged by a fixed read-write head of a tape transport mechanism; whereas, openings 26 and 30 can be used, for instance, for permitting capstan drives to engage tape stretch 24. The tape is wound on hubs 18 and 20 in the form of tape packs 32 and 34, respectively.

Assembly 10 is adapted to be used as a tape guide for each end of tape stretch 24, respectively. Thus, a pair of idler assemblies 10 are located within the cassette between walls 14 and 16 and serve to redirect the tape coming off respective tape packs so that the tape extends along and is movable relative to the adjacent side margin of the cassette.

Assembly 10 includes an idler 36 comprised of a body of suitable material, such as plastic, the body having a central portion 38 and a pair of axially spaced side flanges 40 and 42 integral with central portion 38. Central portion 38 has a continuous, convex, outer, tape-engaging surface 44 which presents a crown as shown in FIG. 2. This surface operates to keep tape 22 centered between flanges 40 and 42 as the tape passes partially about idler 36 and as the idler itself rotates about its central axis in a manner to be described.

Idler 36 has a pair of annular groove-like recesses 46 therein adjacent to respective flanges 40 and 42. Only the recess 46 corresponding to flange 40 is shown in FIG. 4 and one boundary of each recess 46 is defined by a flat, annular surface 48 at one axial extremity of the corresponding flange. Each surface 48 is perpendicular to the axis of rotation of the idler and is oriented with respect to convex surface 44 so as to form a barrier for the adjacent edge of the tape. Specifically, each surface 48 is in the path of axial movement of the tape engaging and partially disposed about the idler. Thus, any tendency for the tape to move axially on the idler in one direction will result in the tape edge engaging the adjacent barrier surface 48. Thus, the tape is prevented from traveling further axially of the flange and it cannot ride up the adjacent inclined surface 50 adjacent to surface 48. The tape is, therefore, prevented from being stretched and the edge of the tape is protected from damage.

Idler 36 has an annular bore 52 formed in one end face 54 thereof. Bore 52 defines a tubular extension 56 which is concentric with bore 52 but has a length shorter than that of the bore. A coil spring 58 surrounds extension 56 and is under compression when the idler is mounted between walls 14 and 16 as shown in FIG. 2. Spring 58 biases the idler into a generally fixed position between walls 14 and 16.

Idler 36 is adapted to be rotatably mounted on a pin 60 which is press-fitted or otherwise secured at its ends to respective walls 14 and 16. The pin is also received within a tubular boss 62 which is integral with wall 16 and is surrounded by an annular recess 64 for receiving at least a portion of flange 42 (FIG. 2). A nylon washer 66 is disposed between the outer, flat end face of extension 56 and the adjacent outer, flat end face of boss 62 to permit extension 56 to rotate freely relative to boss 62.

The opposite end face 68 of idler 36 has a tubular boss 70 integral therewith. Boss 70 has a flat end face 72 which is in rotatable engagement with the adjacent innermost surface 74 of wall 14 within a circular recess 76 thereof, the last-mentioned recess being provided to receive a portion of flange 40.

In use, a pair of assemblies 10 are mounted within cassette 12 between walls 14 and 16. To install assemblies 10, wall 16 is placed on a flat, generally horizontal surface and pins 60 are inserted into respective bosses 62 so that the pins project upwardly from the wall. Washers 66 are then placed on the pins, following which springs 58 are placed on the washers. Then, idlers 36 are mounted on respective pins so that the pins are received within extensions 56. The length of each spring in its uncompressed state will cause the corresponding idler to be positioned slightly above the operative position of FIG. 2. However, wall 14 is then moved into mating relationship to wall 16 so that the outer ends of pins 60 are received within the corresponding recesses 76 in surfaces 74. When this occurs, bosses 70 rotatably engage respective surfaces 74 and washers 66 are disposed between respective extensions 56 and bosses 62. Before wall 14 is moved into place, the tape will have been placed in the manner of FIG. 1 partially about idlers 36 so that tape stretch 24 spans the distance between the idlers to permit it to move uninterruptedly past openings 26, 28 and 30 of the cassette.

As the tape moves over the idlers, the tape tends to conform to the convex, outer surface 44 of each idler 36 as shown in FIG. 2. This convex or crown-like configuration of the idlers keeps the tape centered and minimizes any tendency for the tape to move axially of the idlers. Even if there is some slight movement of the tape axially on an idler, the corresponding tape edge engages the adjacent barrier surface 48 and is inhibited from moving further axially since the tape itself cannot be deformed sufficiently to result in further axial movement relative to the idler.

The spring keeps the idler in a generally fixed position with respect to pin 60 as the tape moves over and is centered by surface 44. Thus, biasing spring 58 cooperates with the crown of the idler to keep the tape centered. Thus, the tape will not be stretched and will move uniformly onto the corresponding tape pack.

Grooves 46 provide unrestricted spaces through which the tape can move if there is any tendency for the tape to move axially. Thus, the edges of the tape will cleanly engage respective barrier surfaces 48 without being interfered with.

I claim:

1. In a tape cassette having a pair of spaced, generally parallel walls, the combination with said walls of an idler assembly comprising: a pin coupled at its ends to respective walls and spanning the distance therebetween, one of the walls having an open, circular recess therein concentric to the pin, the other wall having a tubular boss surrounding the pin and an annular recess surrounding the boss, the boss having a generally flat outer face; an idler provided with a central portion and a pair of opposed, axially spaced flanges, said idler having an end face provided with an annular bore extending thereinto to present a tubular extension, said extension being rotatably mounted on the pin and having a flat, outer end face disposed inwardly of said end face of the idler, said boss extending partially into the bore and terminating in spaced relationship to the outer end face of the extension; a bearing washer disposed between the outer end faces of said extension and said boss and being of a material sufficient to minimize friction due to the rotation of the extension relative to the boss; and a coil spring within said bore and surrounding the tubular extension, said spring being under compression and extending between the washer and the inner end of the bore, said central portion of the idler having a convex outer, continuous, tape-engaging surface spanning at least a major portion of the distance between the flanges, each flange having a flat, annular surface substantially perpendicular to the axis of rotation of the idler and defining a barrier for the adjacent edge of the tape to prevent axial movement of the same relative to said idler.

2. In a cassette as set forth in claim 1, wherein each wall has a recess concentric to the pin, the flanges of the idler being at least partially received within respective recesses.

3. In a tape cassette having a pair of spaced walls, the combination with said walls of an idler assembly comprising: an idler having a convex, outer, tape-engaging surface and a pair of opposed, axially spaced flanges, each flange having a surface defining a barrier for movement of a tape axially of the idler when the tape engages said convex surface, the idler having an annular groove adjacent to each barrier-defining surface, respectively; means mounting the idler between the walls for rotation relative thereto; and means biasing the idler toward one of the walls.

4. In a tape cassette having a pair of spaced walls, the combination with said walls of an idler assembly comprising: an idler having a convex, outer, tape-engaging surface and a bore extending into one end face thereof with at least a portion of the bore being annular to present a tubular extension having an outer end face; a pin extending through said extension and coupled at the ends thereof to said walls, said extension being rotatable on said pin, whereby the idler is mounted between the walls for rotation relative thereto; a bearing member disposed between the end face of the extension and the adjacent wall; and means biasing the idler toward one of the walls.

5. In a tape cassette as set forth in claim 4, wherein said adjacent wall has a tubular boss extending outwardly therefrom, said pin being received within the boss, said boss having a flat, outer end face, the outer end face of the tubular extension being flat, said bearing member comprising a flat Teflon washer disposed between and in engagement with said outer end faces.

6. In a tape cassette as set forth in claim 5, wherein said bias means includes a coil spring surrounding said tubular extension and disposed under compression between the washer and the inner end of the bore.

7. In a tape cassette having a pair of spaced walls, with each wall having a recess therein, the combination with said walls of an idler assembly comprising: an idler having a pair of opposed flanges and a convex, outer, tape-engaging surface, the flanges of said idler being at least partially received within the recesses of respective walls; means mounting the idler between the walls for rotation relative thereto; and means biasing the idler toward one of the walls.

8. An idler for use with a tape cassette comprising: a body having a central portion provided with a convex, outer, tape-engaging surface and a pair of axially spaced, continuous flanges surrounding the central axis of the body on opposed sides of said convex surface, each of the flanges having a surface disposed transversely of the end portions of the convex surface to present a barrier for a tape tending to move axially of the idler, there being an annular groove adjacent to the barrier surface of each flange, respectively, said body having an end face provided with an annular bore extending thereto, said bore defining a tubular extension, the outer end of the extension being substantially flat and spaced inwardly of the bore relative to said end face of the idler.

* * * * *